(12) United States Patent
Heinkele et al.

(10) Patent No.: US 8,244,501 B2
(45) Date of Patent: Aug. 14, 2012

(54) METHOD AND DEVICE FOR DIAGNOSING A POP-OFF VALVE OF A TURBOCHARGER

(75) Inventors: Matthias Heinkele, Weil der Stadt (DE); Patrick Menold, Stuttgart (DE); Michael Drung, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 12/592,791

(22) Filed: Dec. 2, 2009

(65) Prior Publication Data
US 2010/0153067 A1 Jun. 17, 2010

(30) Foreign Application Priority Data
Dec. 17, 2008 (DE) .................... 10 2008 054 838

(51) Int. Cl.
*G06F 15/00* (2006.01)
*G01M 13/00* (2006.01)
(52) U.S. Cl. ........ 702/182; 702/183; 702/184; 702/185; 73/114.79
(58) Field of Classification Search .......... 702/182–185; 73/114.79; 123/2, 253, 258
See application file for complete search history.

(56) References Cited

U.S. PATENT DOCUMENTS
2008/0077304 A1* 3/2008 Suzuki et al. ................. 701/102

FOREIGN PATENT DOCUMENTS
DE 101 11 271 9/2002
* cited by examiner

*Primary Examiner* — Sujoy Kundu
(74) *Attorney, Agent, or Firm* — Kenyon & Kenyon LLP

(57) ABSTRACT

A method for diagnosing an electrically controllable pop-off valve of a turbo-charging device of an internal combustion engine, which pop-off valve is situated in a pop-off pipe bypassing the compressor, includes: providing a reading regarding an air mass flow supplied by an air supply channel to the internal combustion engine; after the activation of the pop-off valve in order to switch over the pop-off valve, analyzing the time curve of the air mass flow reading in order to determine, within a specified time after the beginning of the activation of the pop-off valve, a local maximum of the air mass flow indicated by the air mass flow reading; and detecting a fault of the electrically controllable pop-off valve if the local maximum of the air mass flow is not able to be determined within the specified time.

19 Claims, 3 Drawing Sheets

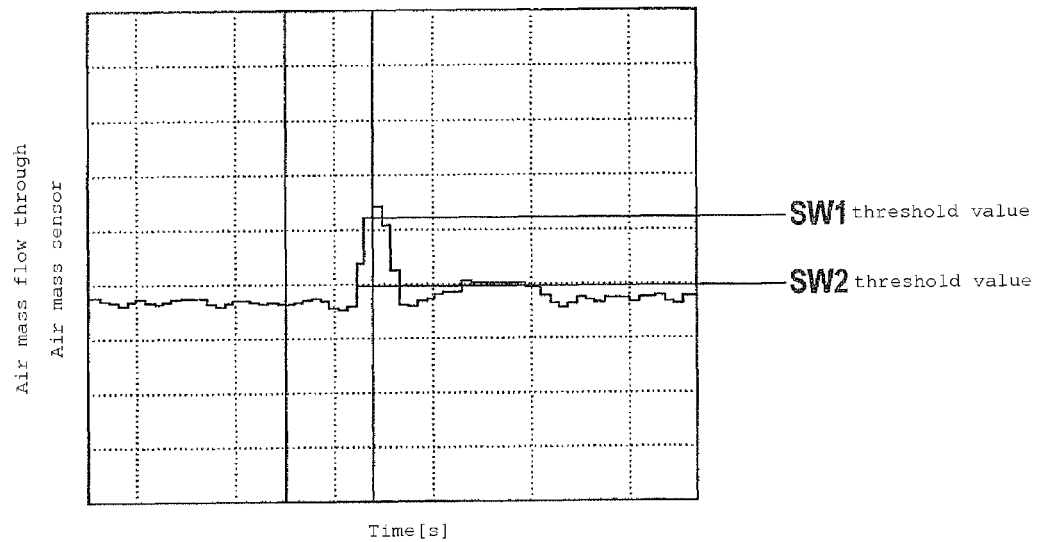
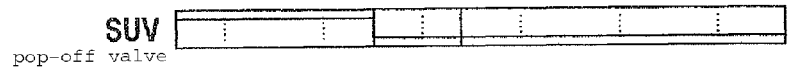
Fig. 3
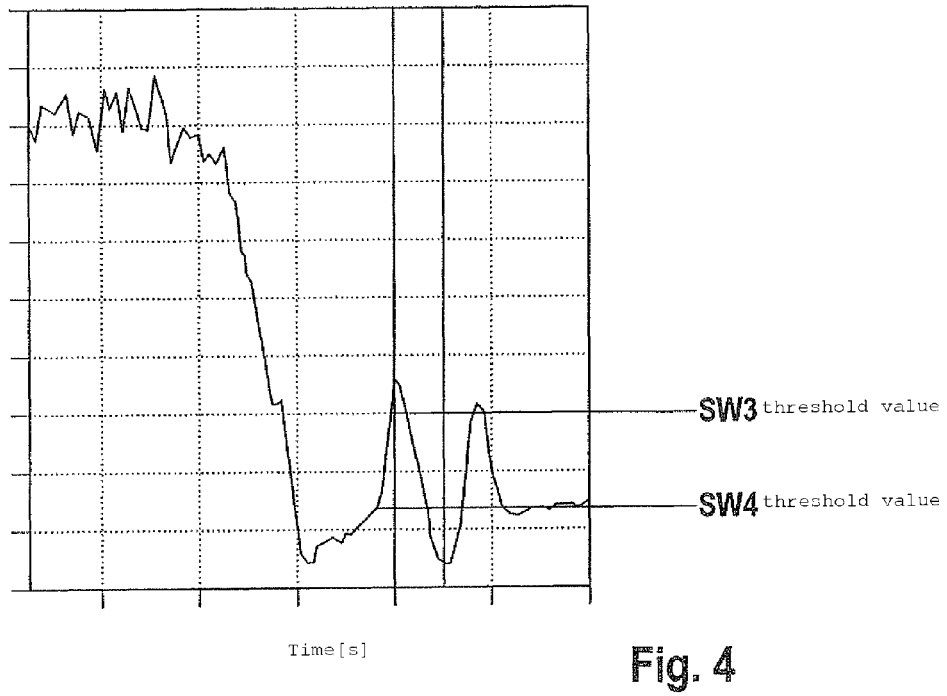
Fig. 4

METHOD AND DEVICE FOR DIAGNOSING A POP-OFF VALVE OF A TURBOCHARGER

BACKGROUND OF THE INVENTION

1. Field of the Invention

The present invention relates to internal combustion engines having a charging device, e.g., a supercharger, which is outfitted with a pop-off valve.

2. Description of Related Art

Today's internal combustion engines that have an exhaust-gas driven charging device, such as a turbocharger, frequently include a so-called pop-off valve, which is situated in a pop-off pipe that bridges a compressor of the charging device. By opening the pop-off valve, a so-called pumping of the charging device may be prevented during a load change. The pumping of the charging device becomes noticeable by pulsations in a section of the air supply channel that is situated directly at the output side of the compressor, the so-called charge air line, and perhaps in the intake manifold of the internal combustion engine, and is caused by stalls at compressor blades of the compressor. Such pumping particularly occurs as a result of a pressure ratio having a higher pressure in the air supply channel and a lower pressure in the environment and at low air mass flows moved by the compressor. Furthermore, the pop-off valve may be used to avoid pressure peaks during the closing of a throttle valve situated downstream from the compressor.

The pulsations created by the pumping may lead to a considerable load on the charging device and, if they happen frequently, bearing damage on the charging device. In addition, the pumping noise represents an acoustical impairment for the passengers and the environment.

In modern engines, the pop-off valve is frequently activated by a control signal that is generated in an engine control unit, in order to open it in a specified manner when the danger of pumping exists.

If a fault occurs in the operation of the pop-off valve, such as a pop-off valve jamming in the closed state, then under certain circumstances the pumping cannot be avoided, and the danger of damage to the engine system is increased.

A method for diagnosing a pop-off valve of a charging device is known from published German patent document DE 101 11 271 A1, in which in the case of a negative load change and detected pulsations, a fault function is detected in the region of the pop-off valve. In this way it is possible to recognize a jamming pop-off valve in the closed state.

However, the method described in German patent document DE 101 11 271 A1 is not suitable for detecting a jamming pop-off valve in the open state. An pop-off valve jamming in the open state may, however, lead to the deterioration in the dynamics of the boost pressure, since a part of the volume flow required by the charging device is uselessly pumped around and around. In the worst case, this may even lead to the desired boost pressure being no longer achieved, and the boost pressure diagnosis determining a low charge fault.

In addition, in the case of an open pop-off valve, backflow in the direction of the air mass sensor and air filter may occur. Since the air mass meter, based on its construction, is usually not designed reliably to measure an air mass flow streaming out of the charge air line via the pop-off valve, this may, as a result, lead to faulty measurements of the air mass flow and faulty calculations of the mass flow into the internal combustion engine, based on the air mass flow measured faultily by the air mass meter, particularly if it is not known to the engine control unit that the pop-off valve is faultily open.

BRIEF SUMMARY OF THE INVENTION

It is an object of the present invention to present a method and a device by which a fault in the pop-off valve is able to be detected, and by which, in particular, the type of fault is able to be determined, that is, for instance, that it may be determined whether the pop-off valve is jamming in the open state or the closed state.

According to a first aspect of the invention, a method is provided for diagnosing an electrically controllable pop-off valve of a charging device of an internal combustion engine, a compressor of the charging device being situated in an air supply channel for supplying air to the internal combustion engine; the pop-off valve being situated in a pop-off pipe that bypasses the compressor, having the following steps:

providing an air mass flow reading regarding an air mass flow supplied by the air supply channel to the internal combustion engine;

after the activation of the pop-off valve in order to switch over the pop-off valve, analyzing the curve over time of the air mass flow reading in order to determine, within a specified time after the beginning of the activation of the pop-off valve, a local maximum of the air mass flow indicated by the air mass flow reading;

detecting a fault of the electrically controllable pop-off valve if the local maximum of the air mass flow is not able to be determined within the specified time.

One idea of the above method is to undertake a diagnosis of a pop-off valve, so that a fault function of the pop-off valve is able to be detected if, during the activation for switching the pop-off valve, a certain behavior of the curve of the air mass flow indicated by the air mass flow reading fails to appear.

Furthermore, the pop-off valve may be activated so as to carry out the switching over of the pop-off valve between a first switching state, in which the pop-off valve is open, and a second switching state, in which the pop-off valve is closed.

According to one example embodiment, the analysis of the curve of the air mass flow reading may be carried out in that the current air mass flow reading is compared to one or more threshold values, in order to determine, by exceeding a first threshold value and a subsequent undershooting of the first or a second threshold value, which is different from the first threshold value, the presence of the local maximum of the air mass flow indicated by the air mass flow reading.

Moreover, during activation for closing the pop-off valve, a pop-off valve jamming in the open position may be recognized as the fault.

During the analysis of the curve over time of the air mass flow reading it may additionally be checked whether, after the activation for opening the pop-off valve, pulsing of the air mass flow reading occurs, a pop-off valve jamming in the closed position being recognized as a fault if the pulsing of the air mass flow reading occurs.

According to a further example embodiment, the analysis of the curve over time of the air mass flow reading is able to be carried out within a first specified time duration, during the activation for opening the pop-off valve and/or within a second specified time duration during the activation for closing the pop-off valve.

Furthermore, after an activation for opening the pop-off valve, the analyzing of the curve over time of the air mass flow reading is able to be carried out, in order to determine, within the specified time duration, at least one specified number of local maxima of the curve over time of the air mass flow reading, in order to detect the presence of the pulsing of the air mass flow indicated by the air mass flow reading.

In particular, after activating to open the pop-off valve, the analyzing of the curve over time of the air mass flow reading may be carried out by comparing the current air mass flow reading to one or more threshold values, so as to determine, by multiple exceeding of a third threshold value and/or multiple undershooting of a fourth threshold value, the presence of the pulsing of the air mass flow indicated by the air mass flow reading.

In particular, the analysis of the curve over time of the air mass flow reading may be carried out based on a curve of a filtered air mass flow reading, in order to filter faulty detections of local maxima based on interference effects or noise.

In addition, the air mass flow reading may be provided as a sensor signal by an air mass sensor or by a pressure sensor.

According to an additional aspect of the present invention, a device is provided for diagnosing an electrically controllable pop-off valve of a charging device of an internal combustion engine, a compressor of the charging device being situated in an air supply channel for supplying air to the internal combustion engine, the pop-off valve being situated in a pop-off pipe that bypasses the compressor, including:
- a recording device for providing an air mass flow reading regarding an air mass flow supplied by the air supply channel to the internal combustion engine;
- a control unit for analyzing the curve over time of the air mass flow reading after the activating of the pop-off valve for switching over, so as to determine, within a specified time duration after the beginning of the activating of the pop-off valve, a local maximum of the air mass flow indicated by the air mass flow reading, and to detect a fault of the electrically controllable pop-off valve, if the local maximum of the air mass flow is not able to be determined, within the specified time duration.

According to a further aspect of the present invention, a computer program is provided, which includes a program code, which implements the above method when it is run on a data processing unit.

BRIEF DESCRIPTION OF SEVERAL VIEWS OF THE DRAWING

FIG. 3 shows a signal-time diagram illustrating the curve of the measured air mass flow during an orderly closing of the pop-off valve.

FIG. 4 shows a signal-time diagram illustrating the curve of the measured air mass flow during jamming of the pop-off valve in the closed state.

DETAILED DESCRIPTION OF THE INVENTION

Figure 1:
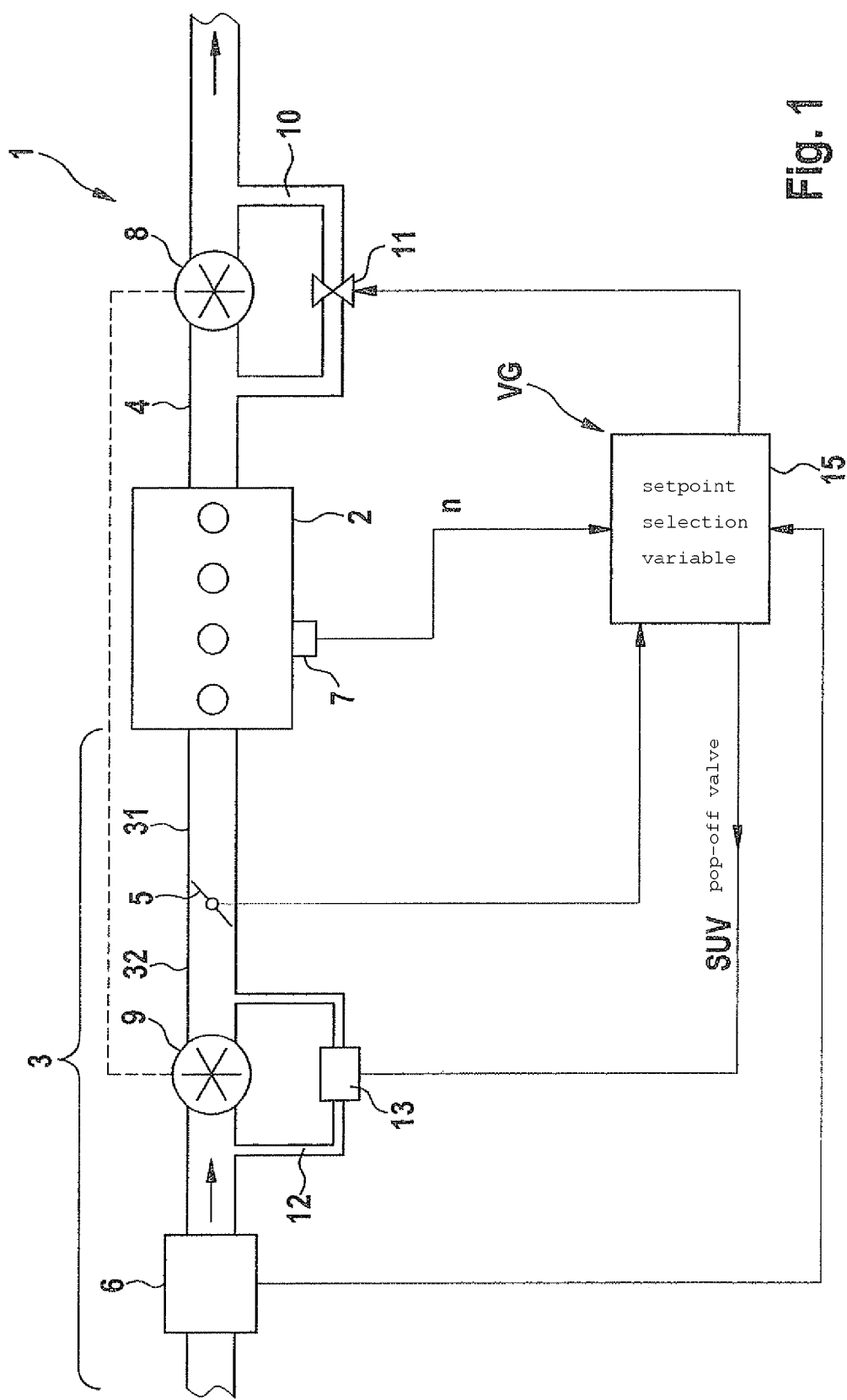
FIG. 1 shows a schematic representation of an internal combustion engine having a charging device.

FIG. 1 shows an engine system 1 having an internal combustion engine 2, to which air is supplied via an air supply channel of an air supply system 3, and from which combustion exhaust gas is carried off via an exhaust gas removal section 4. In air supply system 3 there is a throttle valve 5 for adjusting the air mass flow or the supplied air quantity supplied to a cylinder of internal combustion engine 2. On the input side, air supply system 3 has an air mass sensor 6, that is developed in the form of a hot air mass sensor, and which measures the quantity of the air that flows into air supply system 3, and supplies a corresponding sensor signal as the air mass flow reading. Air supply system 3 also has an intake manifold 31, which is situated between throttle valve 5 and the inlet to internal combustion engine 2.

Engine system 1 has a charging device which includes an exhaust gas turbine 8 in exhaust gas removal section 4, for example, and a compressor 9 in air supply system 3. Exhaust gas turbine 8 drives compressor 9 via a shaft that is not shown. The coupling between exhaust gas turbine 8 and compressor 9 is shown as a dashed line.

The input side and the output side of exhaust gas turbine 8 are connected to each other via a bypass pipe 10, in which a controllable bypass valve 11 is situated. Alternatively, any other desired embodiments of the exhaust gas side, especially of the exhaust gas turbine, are conceivable.

Compressor 9 in air supply system 3 is used to provide air, under a boost pressure, to a section of the air supply channel that is located on the output side of compressor 9, charge-air line 32 of air supply system 3. Compressor 9 is provided with a pop-off pipe 12, which connects the output side (outlet, charge-air line 32) of compressor 9 to the input side (inlet). In pop-off pipe 12 a pop-off valve 13 is provided which is electrically switchable, in order to lead away air between compressor 9 and throttle valve 5.

For the control of bypass valve 11, pop-off valve 13 and throttle valve 5 an engine control unit 15 is provided, which undertakes the control corresponding to the engine operation that is to be set. This control is carried out corresponding to one or more setpoint selection variables VG, which may include a driver's torque command, and as a function of additional measured variables, such as a rotational speed of internal combustion engine 2 recorded by a rotational speed sensor 7, for example, and a reading concerning an air quantity flowing into intake manifold 31, provided by air mass sensor 6.

Engine control unit 15 opens pop-off valve 13 when an operating state exists in which the charging device is particularly prone to compressor pumping, that is, particularly prone to stalling created at the compressor wheel blades of compressor 9, whereby pulsations in charge-air line 32 are brought on. This pumping is harmful and increases the wear in compressor 9.

Specifically, engine control unit 15 is able to open pop-off valve 13 if throttle valve 5 is completely closed during a load change, or, as a result of the load change, throttle valve 5 is put into a position having only a slight opening cross section, so that the boost pressure is relatively high before throttle valve 5, compared to states in which throttle valve 5 is opened further, and in which the air mass flow through intake manifold 31 and charge-air line 32 are slight. These states occur particularly during a closing process of throttle valve 5, based on a drop in load, since compressor 9 requires a large air mass, which leads to a rapid rise or rather a rapid increase in the boost pressure at a diminishing air mass flow through compressor 9.

Typical fault cases of pop-off valve 13 are that it jams in the closed or in the open state, i.e. pop-off valve 13 does not let itself be opened or closed, respectively.

In the case of a pop-off valve 13 jammed in the open state there is the problem that the charging device has to make an increased effort in providing the boost pressure between compressor 9 and throttle valve 5, and that, under certain circumstances, the required boost pressure is not able to be provided any more. If such a fault arises, it is meaningful to switch over the engine operation to a pure throttle valve operation, in which the air supply into internal combustion engine 2 is determined exclusively by the setting of throttle valve 5, so that at least one defined operating behavior is able to be achieved.

If a previously opened pop-off valve 13 (as detected in the open position) is closed, when the closing takes place there comes about a short-duration (i.e. limited duration) increase in the air quantity flowing into the charge-air line, as measured by air mass sensor 6. The reason for this is that, in the case of opened pop-off valve 13, a greater mass flow flows via compressor 9 of the charging device than over air mass sensor 6 and via throttle valve 5. The reason is that a part of the mass flow required by compressor 9 flows back via pop-off valve 13, and is thus being pumped in a circle. When pop-off valve 13 is closed, compressor 9, on account of inertia, briefly continues to convey the same mass flow, which now, however, no longer flows via pop-off valve 13, to the input side of compressor 9. Consequently, the total mass flow has to flow via air mass sensor 6, which has the effect of briefly increasing the air mass flow measured there. The amount of the brief increase depends on which air mass compressor 9 is conveying, and thus depends on the operating state of the charging device. The operating state of the charging device is given by the drive energy provided by the exhaust gas, the rotational speed of the exhaust gas turbine and the like.

One typical curve of an increase in the air mass flow based on the closing of pop-off valve 13 is shown qualitatively in FIG. 3. After the level change of a control signal POP-OFF VALVE for activating pop-off valve 13, a brief increase in the air quantity flowing through air mass sensor 6 may be seen, and subsequently again a drop to the previously present initial level. The diagnosis of pop-off valve 13 for determining a jamming position in the opened state may also be carried out by checking the signal of air mass sensor 6 for this short-duration increase. If this short-duration increase of the sensor signal, or rather of the measured air mass flow does not occur, it is determined that pop-off valve 13 was not able to be closed in response to a corresponding control by engine control unit 15, or that, in a faulty manner, it was already in the closed position at the time of the activation.

In the additional fault case in which a pop-off valve 13 jams in the closed state or is not able to be opened for other reasons, if there are rapid load changes from high loads to low loads, that is, during changes from a loaded operation, having an almost opened throttle valve 5, to an operation having a completely or most extensively closed throttle valve 5, there comes about a so-called compressor pumping, which becomes noticeable by oscillations in the boost pressure and the air quantity flowing via intake manifold 31 or air mass sensor 6. If a pop-off valve 13 is to be opened during a decreasing load, then it may be detected, by the presence of pulsations in charge air line 32, which are able to be ascertained via air mass sensor 6, whether pop-off valve 13 is jammed in the closed state.

It is consequently possible to determine both fault cases of pop-off valve 13 by an evaluation of the air mass flow detected by air mass sensor 6.

The curve of the air mass flow, measured by air mass sensor 6 during a load decrease, without the opening of pop-off valve 13, may be seen in FIG. 4.

The investigation of the sensor signal (air mass flow signal) that is supplied by air mass sensor 6 may take place, for example, in that it is checked whether, because of the switching of pop-off valve 13, there is a change in the measured air mass flow. This may be determined by the exceeding or the undershooting of specified threshold values within a certain time duration, for example. When a fault case is present in which pop-off valve 13 jams in the closed state, as shown in FIG. 4, then by detecting a repeated (for instance, a two-time) exceeding and/or undershooting of a single threshold value or a third and a fourth threshold value SW3, SW4, the pulsing may be determined. In general, compressor pumping may be determined if at least a certain number of local maxima is determined within the specified time duration.

The third and the fourth threshold value SW3, SW4 may be determined as a function of a level of the air mass flow signal before switching, particularly by a percentage (relative) or absolute deviations from the level of air mass flow signals at a certain point in time before the switching. Third threshold value SW3, which has to be exceeded by the level of the air mass flow signal, may be greater than fourth threshold value SW4, which has to be undershot by the level of the air mass flow signal, so that the diagnostic method becomes more robust with respect to noise and interference influences.

In the case of pop-off valve 13 jamming in the opened state, a first threshold value SW1 may be defined (e.g. by applying a switchover threshold value US), starting from the level, measured by air mass sensor 6 before the switching of pop-off valve 13, of the signal representing the air mass flow, and, using this first threshold value SW1, it may be determined whether the brief change or increase in the air mass flow via air mass sensor 6 has a certain minimum quantitative value. In this way, a local maximum of the air mass flow is able to be determined which points to an orderly switchover process. With the aid of a second threshold value SW2, which is also oriented to the level measured before the switching of pop-off valve 13 (it may, for example, correspond to second threshold value SW2 or deviate from it by a difference value), it may be determined whether, after the rise in the air mass flow via air mass sensor 6, the air mass flow drops off again in the direction of the air mass flow signal measured before the switching. In this way, a local maximum of the air mass flow is able to be determined.

First threshold value SW1, which in this case has to be exceeded by the level of the air mass flow signal, may be equal to, or greater than second threshold value SW2, which subsequently has to be undershot by the level of the air mass flow signal, so that the diagnostic method becomes more robust with respect to noise and interference influences.

The checking for the presence of the local maximum takes place within a specified time period after the switching of pop-off valve 13, the specified time period depending on the type of switchover, that is, switching to an open position or to a closed position. The time period is specified and depends on the dynamic response of the air system. The time durations may be determined by measurements on the air system on a test stand. The respective time period should be selected to be sufficiently great, on the one hand, that a local maximum or a pulsing of the curve over time, of the air mass flow reading, is able to be securely detected as a result of a switchover that took place beforehand. On the other hand, the respective time period should be selected to be as short as possible, so that a faulty diagnosis, based on dynamic changes in the air supply, which are not conditioned upon a switchover of pop-off valve 13, may be avoided and the time expenditure for the diagnosis may be held to as low as possible.

Figure 2:
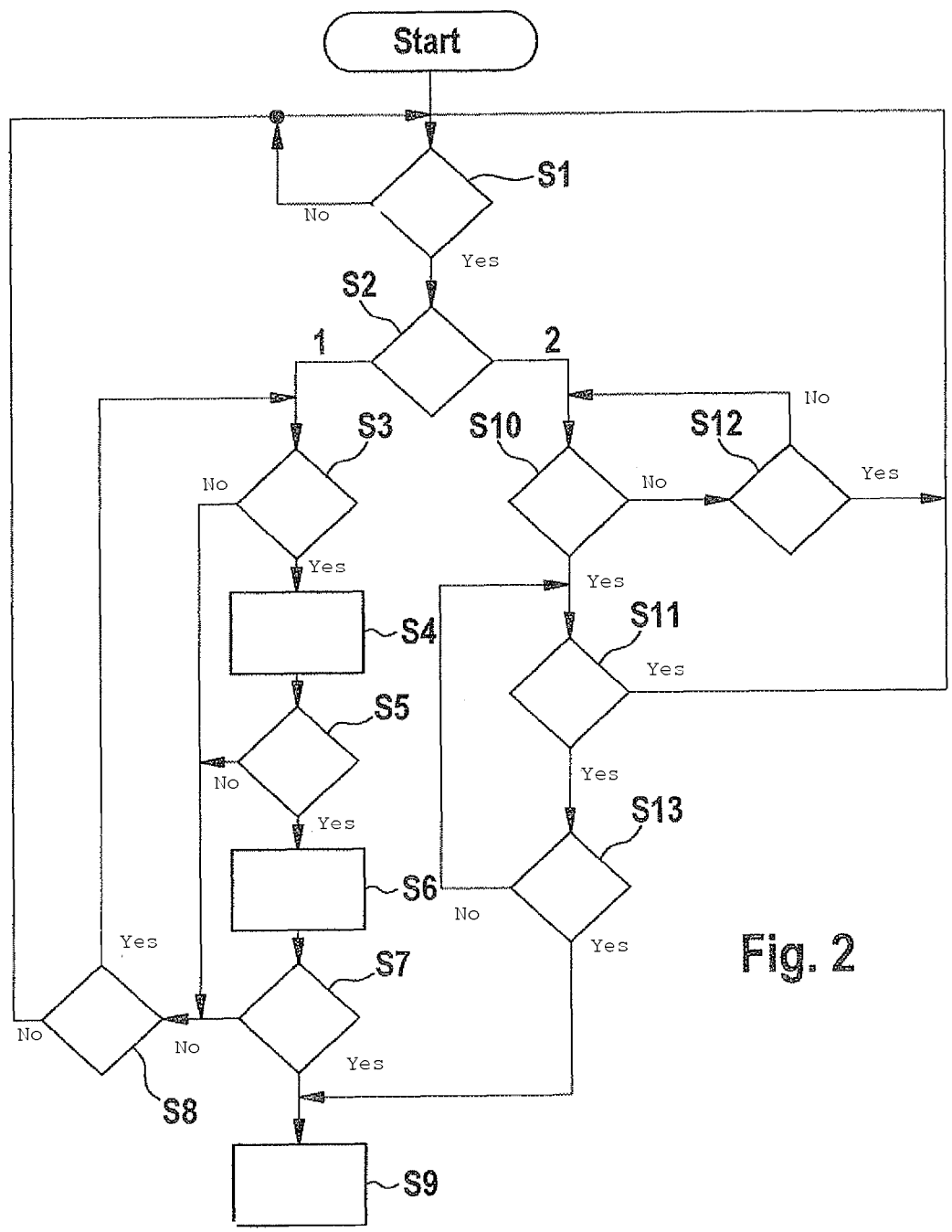
FIG. 2 shows a flow chart representing a method for the diagnosis of a pop-off valve.

The method for diagnosing pop-off valve 13 is shown schematically in the flow chart of FIG. 2. In a step S1 it is detected whether a switching of pop-off valve 13 is taking place. The switching of pop-off valve 13 is controlled by engine control unit 15. If switching of pop-off valve 13 is taking place (alternative: yes), it is checked in next step S2 whether engine control unit 15 is activating pop-off valve 13 so that the latter is supposed to open (alternative 1). Then, subsequently in the sequence in a step S3, the exceeding of third threshold value SW3 and, if the exceeding of third threshold value SW3 has been detected (alternative: yes), in a step S4 a first counter (not shown) in engine control unit 15 is incremented. Subsequently, in a step S5 the undershooting of the fourth threshold value SW4 is queried and, if this is the case, a second counter (not shown) in engine control unit 15 is incremented.

In step S7 it is checked whether at least one of the counters has determined a multiple (e.g. dual, triple or more than triple) exceeding of third threshold value SW3 and/or the undershooting of fourth threshold value SW4 or the multiple presence of local maxima or minima, whereby an oscillation of the air mass flow flowing into charge air line 3 would be detectable. This is an indication of compressor pumping. If such a compressor pumping is present (alternative: yes), one may conclude that there is a jamming pop-off valve 13 in a closed state. The number of required detections of exceeding third threshold value SW3 and/or undershooting of fourth threshold value SW4 may be specified. The number should be selected to be sufficiently large so that, on the one hand, a secure detection of compressor pumping is assured, and, on the other hand, the time for the detection of the fault should be selected to be as small as possible, in order to make possible a rapid diagnosis of pop-off valve 13.

If in step S7 (not yet) any compressor pumping has been determined (alternative: no), a query is made in step S8 as to whether a predetermined time period has elapsed since the switching. If so, it is concluded that there has been an orderly functioning of pop-off valve 13, and the system goes back to step S1. If the predetermined time period has not elapsed yet (alternative: yes), the system returns to step S3.

If compressor pumping is determined in step S7, a fault treatment routine is able to be called up in step S9. For example, an emergency operation type could be called up in which internal combustion engine 2 is operated exclusively in throttle valve operation, that is, the applied air quantity is determined only by the setting of throttle valve 5.

If it is determined in step S2 that engine control unit 15 is controlling pop-off valve 13, so that the latter is to close (alternative 2), in sequence in a step S10 the exceeding of first threshold value SW1 by the air mass flow measured by air mass sensor 6 is queried and, if the exceeding of first threshold value SW1 by the air mass flow measured by air mass sensor 6 has been detected (alternative: yes), in a step S11 the undershooting of second threshold value SW2 by the air mass flow measured by air mass sensor 6 is queried, and if this is the case, (alternative: yes), a corresponding rise in the air mass flow was able to be determined by air mass sensor 6, whereby the orderly functioning of pop-off valve 13 was established. Thereupon the system jumps back to step S1.

If in step S10 no exceeding of third threshold value SW3 by the air mass flow measured by air mass sensor 6 (alternative: no) is determined, it is checked in a step S12 whether a specified time period has already elapsed since the switchover of pop-off valve 13. If this is the case (alternative: yes), a fault is detected, and the system jumps to step S9, in order to take up a suitable emergency operation type. If the predetermined time period has not elapsed yet (alternative: no), the system returns to step S10.

If in step S11 no exceeding of fourth threshold value SW4 by the air mass flow measured by air mass sensor 6 has been determined (alternative: no), it is checked in a step S13 whether a specified time period has already elapsed since the switchover of pop-off valve 13. If this is the case (alternative: yes), a fault is detected, and the system jumps to step S9, in order to take up a suitable emergency operation type. If the specified time period has not elapsed (alternative: no), the system returns to step S11.

The amount of threshold values SW1 to SW4 is dependent upon the respective operating point of internal combustion engine 2, and particularly on the air mass flow measured via air mass sensor 6 that is present immediately before the controlling of pop-off valve 13. In that way, for example, the threshold values may be determined relatively to the air mass flow, or by applying an absolute value. Threshold values SW1 to SW4 may be stored in and supplied by engine control unit 15 in suitable characteristics maps, as a function of rotational speed, of the load, of specification variable VG, of temperatures in the engine system and the like.

What is claimed is:

1. A method for diagnosing an electrically controllable pop-off valve of a turbo-charging device of an internal combustion engine, a compressor of the turbo-charging device being situated in an air supply channel for supplying air to the internal combustion engine, the pop-off valve being situated in a pop-off pipe bypassing the compressor, the method comprising:
    providing an air mass flow reading regarding an air mass flow supplied by the air supply channel to the internal combustion engine;
    after an activation of the pop-off valve in order to switch over the pop-off valve, analyzing by a processor a time curve of the air mass flow reading in order to determine, within a specified time after the beginning of the activation of the pop-off valve, whether a local maximum of the air mass flow indicated by the air mass flow reading appears; and
    detecting, by the processor, a fault of the electrically controllable pop-off valve if the local maximum of the air mass flow is not able to be determined within the specified time period.

2. The method as recited in claim 1, wherein the pop-off valve is activated to carry out a switching of the pop-off valve between a first switching state, in which the pop-off valve is open, and a second switching state, in which the pop-off valve is closed.

3. The method as recited in claim 2, wherein the analysis of the time curve of the air mass flow reading includes comparison of the current air mass flow reading to at least a first threshold value, and wherein the presence of the local maximum of the air mass flow indicated by the air mass flow reading is determined by exceeding of the first threshold value and a subsequent undershooting of one of the first threshold value or a second threshold value different from the first threshold value.

4. The method as recited in claim 3, wherein during an activation of the pop-off valve to switch to the second switching state, jamming of the pop-off valve in the first switching state is detected as the fault.

5. The method as recited in claim 3, further comprising:
    checking, during the analysis of the time curve of the air mass flow reading, whether a pulsing of the air mass flow reading occurs after an activation to open the pop-off valve, wherein a jamming of the pop-off valve in a closed position is detected as a fault if the pulsing of the air mass flow reading occurs.

6. The method as recited in claim 5, wherein, after the activation for opening the pop-off valve, the analysis of the time curve of the air mass flow reading is performed in order to determine, within the specified time period, at least one specified number of local maxima of the curve of the air mass flow reading, in order to detect the presence of the pulsing of the air mass flow indicated by the air mass flow reading.

7. The method as recited in claim 5, wherein the analysis of the time curve of the air mass flow reading is carried out within at least one of a first specified time duration during the activation for opening the pop-off valve and a second specified time duration during the activation for closing the pop-off valve.

8. The method as recited in claim 3, wherein the air mass flow reading is filtered, and a time curve of the filtered air mass flow reading is analyzed in order to determine, within the specified time after the beginning of the activation of the pop-off valve, a local maximum of the air mass flow indicated by the air mass flow reading.

9. The method as recited in claim 3, wherein the air mass flow reading is provided as a sensor signal by one of an air mass sensor or a pressure sensor.

10. A device for diagnosing an electrically controllable pop-off valve of a turbo-charging device of an internal combustion engine, a compressor of the turbo-charging device being situated in an air supply channel for supplying air to the internal combustion engine, the pop-off valve being situated in a pop-off pipe bypassing the compressor, the device comprising:
a recording device configured to provide an air mass flow reading regarding an air mass flow supplied to the internal combustion engine by the air supply channel; and
a control unit configured to: (a) analyze, after an activation of the pop-off valve in order to switch over the pop-off valve, a time curve of the air mass flow reading in order to determine, within a specified time after the beginning of the activation of the pop-off valve, whether a local maximum of the air mass flow indicated by the air mass flow reading appears; and (b) detect a fault of the electrically controllable pop-off valve if the local maximum of the air mass flow is not able to be determined within the specified time period.

11. A non-transitory computer-readable storage medium storing a computer program, which is executable by a processor, comprising:
a program code arrangement having a program code for diagnosing an electrically controllable pop-off valve of a turbo-charging device of an internal combustion engine, a compressor of the turbo-charging device being situated in an air supply channel for supplying air to the internal combustion engine, the pop-off valve being situated in a pop-off pipe bypassing the compressor, by performing the following:
providing an air mass flow reading regarding an air mass flow supplied by the air supply channel to the internal combustion engine;
after an activation of the pop-off valve in order to switch over the pop-off valve, analyzing a time curve of the air mass flow reading in order to determine, within a specified time after the beginning of the activation of the pop-off valve, whether a local maximum of the air mass flow indicated by the air mass flow reading appears; and
detecting a fault of the electrically controllable pop-off valve if the local maximum of the air mass flow is not able to be determined within the specified time period.

12. The device as recited in claim 10, wherein the pop-off valve is activated to carry out a switching of the pop-off valve between a first switching state, in which the pop-off valve is open, and a second switching state, in which the pop-off valve is closed.

13. The device as recited in claim 12, wherein the analysis of the time curve of the air mass flow reading includes comparison of the current air mass flow reading to at least a first threshold value, and wherein the presence of the local maximum of the air mass flow indicated by the air mass flow reading is determined by exceeding of the first threshold value and a subsequent undershooting of one of the first threshold value or a second threshold value different from the first threshold value.

14. The device as recited in claim 13, wherein during an activation of the pop-off valve to switch to the second switching state, jamming of the pop-off valve in the first switching state is detected as the fault.

15. The device as recited in claim 13, wherein the control unit is also configured to check, during the analysis of the time curve of the air mass flow reading, whether a pulsing of the air mass flow reading occurs after an activation to open the pop-off valve, and wherein a jamming of the pop-off valve in a closed position is detected as a fault if the pulsing of the air mass flow reading occurs.

16. The device as recited in claim 15, wherein, after the activation for opening the pop-off valve, the analysis of the time curve of the air mass flow reading is performed in order to determine, within the specified time period, at least one specified number of local maxima of the curve of the air mass flow reading, in order to detect the presence of the pulsing of the air mass flow indicated by the air mass flow reading.

17. The device as recited in claim 15, wherein the analysis of the time curve of the air mass flow reading is carried out within at least one of a first specified time duration during the activation for opening the pop-off valve and a second specified time duration during the activation for closing the pop-off valve.

18. The device as recited in claim 13, wherein the air mass flow reading is filtered, and a time curve of the filtered air mass flow reading is analyzed in order to determine, within the specified time after the beginning of the activation of the pop-off valve, a local maximum of the air mass flow indicated by the air mass flow reading.

19. The device as recited in claim 13, wherein the air mass flow reading is provided as a sensor signal by one of an air mass sensor or a pressure sensor.

* * * * *